INVENTOR
RICHARD H. SWANSON

__United States Patent Office__  3,248,160
Patented Apr. 26, 1966

3,248,160
CONTAINER CLAMPING ASSEMBLY
Richard H. Swanson, Manitowoc, Wis., assignor to The Manitowoc Company, Inc., Manitowoc, Wis., a corporation of Wisconsin
Filed Nov. 13, 1963, Ser. No. 323,345
17 Claims. (Cl. 312—304)

This invention relates, generally, to a clamping assembly for at least one and as much as a plurality of containers.

More particularly, the present invention pertains to a clamping assembly comprising at least one clamping band for fixedly positioning at least one and as much as a plurality of containers in spaced relationship with respect or relative to a supporting structure, such as a food locker, cabinet, or the like.

It is a primary object of this invention to provide an assembly for clamping, positioning or otherwise rigidly and fixedly securing at least one and as much as a plurality of containers of various shapes and dimensional extent in spaced relationship relative to a supporting structure and in close proximity with respect to one another.

It is another primary object of the present invention to provide an assembly for clamping, positioning or otherwise fixedly securing at least one and as much as a plurality of containers for receiving or storing various types of products, such as food products, or the like, in spaced relationship relative or with respect to a supporting structure, said assembly being so constituted and arranged as to be unusually readily mounted within and upon said structure and easily removable therefrom for such purposes as cleaning.

A still further primary object of the present invention is to provide an assembly for clamping, positioning or otherwise rigidly and fixedly securing at least one and as much as a plurality of containers of various shapes and dimensional extent in spaced relationship relative to a supporting structure and in close proximity with respect to one another, said assembly being so constituted and arranged as to be unusually efficiently and readily manually operable to release a container or containers therefrom for the ready removal thereof from said structure.

Another primary object of this invention is to provide an assembly for clamping, positioning, or otherwise fixedly and rigidly securing at least one and as much as a plurality of containers, of various configurations and dimensional extent, for receiving or storing diverse products, such as food products, or the like, in spaced relationship relative to a supporting structure, said assembly being so constituted and arranged as to be unusually readily mounted within and upon said structure and easily removable therefrom, for such purposes as cleaning, and unusually efficiently and readily manually operable to release a container or containers therefrom for the ready removal thereof from said supporting structure.

Yet another primary object of this invention is to provide an assembly for clamping, positioning, or otherwise rigidly and fixedly positioning at least one and as much as a plurality of containers, of various configurations and dimensional extent, for receiving or storing hot or cold food products within an insulating supporting structure and in spaced relationship relative to the walls or interior surfaces thereof, said assembly being manually operable and so constituted and arranged as to unusually efficiently, readily and quickly fixedly position said container or containers within said structure or release the same for easy removal therefrom.

Still further, it is a primary object of the present invention to provide a manually operable clamping assembly for fixedly positioning at least one and as much as a plurality of containers, of generally uniform configuration and dimensional extent, for receiving and storing frozen food products, such as ice cream, or the like, in an insulated frozen food supporting structure, such as a cabinet, and in spaced relationship relative to the interior surfaces thereof, said clamping assembly being so constituted and arranged as to the readily applied to or released from the container or containers within the supporting structure.

A still further primary object of the present invention is to provide an unusually efficiently and readily manually operable clamping and mounting assembly for positioning various types of food products, such as frozen foods, within and in spaced relationship relative to the interior wall surfaces of an insulated supporting structure, said assembly being so constituted and arranged as to be readily and quickly removable from the structure for cleaning, sterilizing, or the like, and easily and quickly again mounted therewithin without the use of any mounting implements, such as tools.

It is a still further primary object of this invention to provide a quickly manually mountable and removable metallic clamping assembly for positioning at least one and as much as a plurality of containers, of generally uniform configuration and dimensional extent, for receiving and storing various food products, such as ice cream, or the like, in an insulated ice cream containing and supporting structure, such as a cabinet, said assembly being so constituted and arranged as to maintain the container or containers in spaced relationship relative to the interior surface thereof, being fabricated substantially of a rust-resistant material, such as wire, or the like, and being easily and quickly positioned within said structure and upon the surfaces thereof or released therefrom without the use of mounting implements, such as tools.

Furthermore, a primary object of the present invention is to provide a generally metallic clamping assembly for positioning at least one and as much as a plurality of generally uniformly configurated containers in a food supporting structure in spaced relationship relative to positioning various types of food products, such as frozen the interior surfaces thereof, said assembly being unusually efficiently manually operable without the use of any implemental aids, and being simple of structure, reliable in operation, durable in use and of economical fabrication.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Referring now to the drawings, there is illustrated therein an elongated supporting structure or cabinet 10, of generally rectangular configuration, and being particularly adapted to have disposed therewithin various products, such as frozen foods. The cabinet comprises a plurality of generally vertically extending side walls 12, a plurality of generally vertically extending end walls 14 and a generally horizontally extending bottom wall 16. An inner or interiorly positioned refrigerated chamber 18 is positioned or disposed within and is of the same geneneral configuration as the cabinet. Similar with respect thereto, the chamber 18 comprises generally vertically extending side walls 20, generally vertically extending end walls 22 and a generally horizontally extending bottom wall 24. The walls of the chamber 18 are suitably spaced from the walls of the cabinet 10, providing a space therebetween in which appropriate insulation 26 is to be disposed.

The cabinet 10 preferably is of the refrigerated store type for containing one or more conventional generally cylindrical containers 28 from which ice cream of various flavors is to be dispensed. In this connection the cabinet 10 may be a self-contained cabinet with a refrigerating unit (not shown) mounted within the periphery thereof, as defined by the walls 12 and 14. Thus, one end of the cabinet will be fabricated with a shelf (not shown) extending inwardly thereof and medially of its height, enabling a refrigeration unit to be positioned therebeneath and within the space formed thereby. The space will be completely contained within and defined by the periphery of the cabinet so that the refrigerating unit does not protrude therefrom. In this manner, the space needed to accommodate the cabinet 10 with its own refrigeration unit is generally equal to that of the cabinet, there being no need to provide additional space to accommodate the refrigerating unit or any protrusions therefrom.

The space between the walls 12 and 20 is closed at the upper end thereof by a stepped or counter-bored extension 30 running or extending completely the length of the cabinet 10, or completely of the sides or the longitudinal dimensional extent thereof. The extension 30 may be integral with the wall 12 and extends inwardly thereof and downwardly or generally vertically into the cabinet, terminating near or adjacent and in the plane of a generally vertically extending projection 32 integral with the wall 20 and extending upwardly thereof. Preferably, the projection 32 is disposed outwardly of the wall 20 for a purpose that will become readily apparent hereinafter. A stepped or counter-bored insert 34 is positioned within the cabinet 10 and extends completely the length and along each of the sides thereof. The inner wall of the insert is positioned to lie in the plane of the wall 20, thus being spaced inwardly of the projection 32 and the extension 30. Additionally, the insert 34 is extended upwardly and outwardly of the cabinet and thence downwardly along the side walls 20, being disposed or positioned in abutting relationship relative or with respect thereto.

A spacer or spacing block 36 is positioned or disposed between the insert 34 and the projection 32 and extension 30, the width of the block being substantially the same as the dimensional extent of the space. In this manner, flexure of any of the portions of the extension 30, the insert 34 and the projection 32 is precluded. Additionally, a bearing or bearing block 38 is positioned outwardly of the extension 30 and the projection 32 for the purpose of bringing the extension and projection into a firm abutting relationship relative or with respect to the spacer 36, and the later into the same relationship relative to the insert 34. To this end, a tie rod 40 extends between the side walls 20 of the chamber 18, through the insert 34, the spacer 36 and the bearing 38. The ends of the tie rod are threaded and are, therefore, mutually cooperatively engageable with conventional threaded fasteners 42. Thus, the bearings 38 bring the extension 30 and the projection 32 into firm abutting relationship with the spacer 36 and the latter into the same relationship with the insert 34 when the fasteners are run home. While any number of tie rods 40 may be used, generally one such tie rod is positioned medially of the longitudinal dimensional extent of the cabinet 10. In addition, the tie rod 40 serves the function of providing a transversely extending support for and between the side walls 20 of the chamber 18, medially of the longitudinal dimensional extent thereof, enabling the walls to remain in a generally vertically extending direction by substantially precluding any flexure thereof. To this end, the tie rod preferably is positioned near or adjacent the upper open end of the cabinet.

Figures 1, 2:
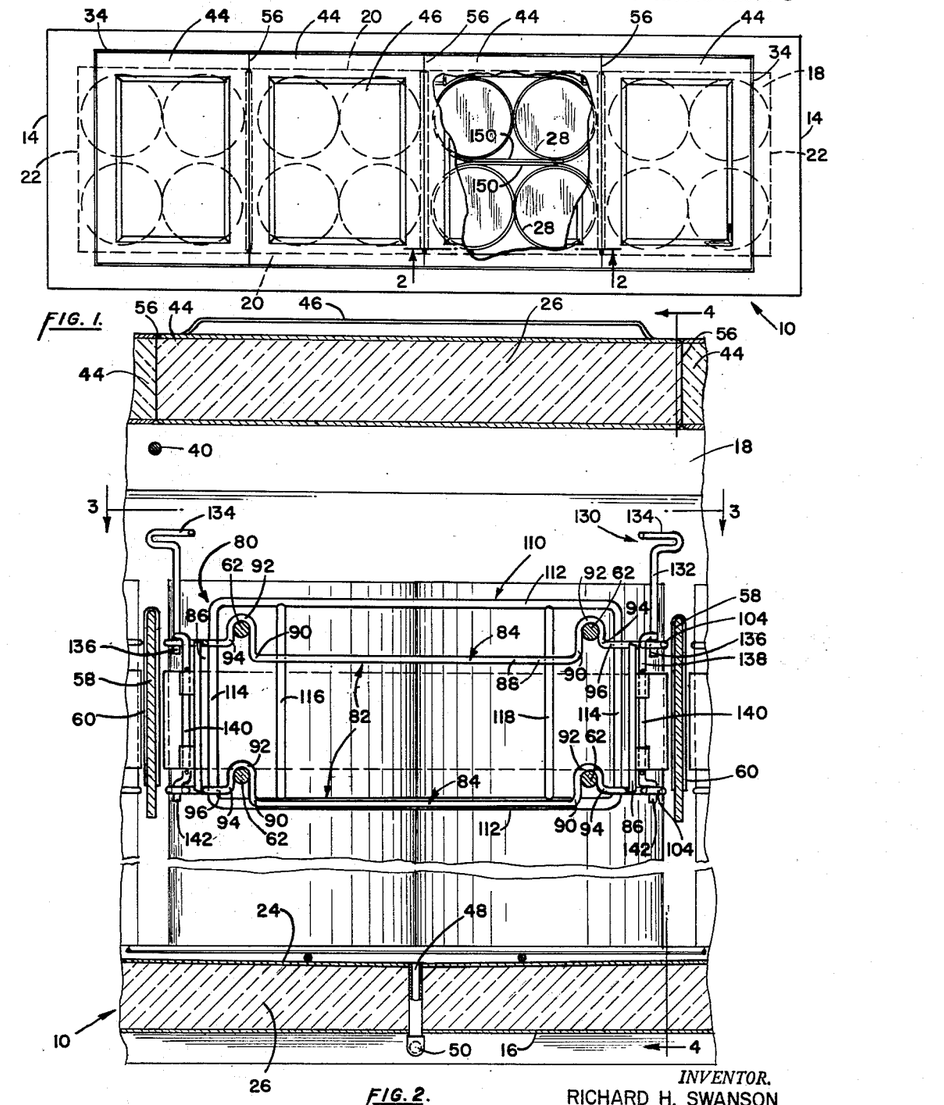
FIGURE 1 is a plan view of an insulated frozen food container, partially broken away, illustrating a plurality of ice cream containers fixedly positioned therewithin by a clamping assembly constructed in accordance with the present invention.
FIGURE 2 is a vertical sectional view taken along the line 2—2 of FIGURE 1, drawn to an enlarged scale, and illustrating various details and component parts of a clamping assembly constructed in accordance with the present invention.

As particularly illustrated in FIGURE 1, a plurality of covers or closures 44 are positionable upon the inserts 34 to close the upper open end of the cabinet 10. The closures 44 are of generally square configuration and are so dimensioned that when each is in position relative to the cabinet, the upper end thereof is completely closed longitudinally and transversely thereof. In accordance with this construction, the ends or edges of the closures abut one another, in a direction transversely of the cabinet, and to such an extent as to form and provide a seal therebetween. As illustrated in FIGURE 1, four readily removable closures 44 are provided, each of which preferably is a double-walled closure having insulation 26 disposed therebetween. It is to be understood that the closures 44 may be fabricated differently and, for example, may be fabricated of a number of panes of suitable insulating or insulated glass. The closures 44 have a raised generally central portion presenting a handle 46, enabling the closures to be readily removed from the cabinet 10 and replaced relative thereto.

Additionally, the closures 44 are stepped correspondingly with respect or relative to the insert 34, along at least two sides or edges thereof. There are presented, therefore, horizontal portions along the insert and along the closures which mutually cooperatively engage one another to provide an adequate seal in a generally horizontal direction. It is not necessary, therefore, that the dimensional extent of the closures be equal to the transverse dimensional extent of the opening at the upper end of the chamber 18, as defined by the distance between the vertically extending portions of the insert 34. However, it is desirable that the closures 44 at the ends of the cabinet positively seal with respect or relative to the upper open end of the chamber 18. Thus, the insert 34, at the ends of the cabinet 10, are not stepped and, therefore, are vertically linear, disposed in coplanar relationship with respect or relative to the vertical end walls 22 of the chamber 18. The dimensional extent of each of the closures is chosen, therefore, so that the end closures positively abut the insert 34 at the end walls 22 of the chamber 18 and positively abut one another mediately of the longitudinal dimensional extent of the cabinet 10 to provide a positive seal in a generally vertical direction.

The bottom wall 24 of the chamber 18 is tapered or sloped generally downwardly towards the center of the chamber and a drain opening 48. The drain opening preferably is disposed generally medially of the longitudinal dimensional extent or length of the chamber 18 and is connectable to a drain pipe or conduit 50, for the discharge or disposal of any liquid that might form within the chamber. It is desirable that the drain conduit 50 be hidden from view. To this end, the side walls 12 and the end walls 14 of the cabinet 10 are provided with an integral base wall or rail 52, extending completely about the cabinet, and the bottom wall 16 thereof spaced from the generally coplanar surface, such as a floor, upon which the cabinet is to be positioned. A space is therefore provided between the surface and the bottom wall 16 within which the conduit 50 is disposed. The base wall 52 may be provided with suitable openings or apertures 54 through which the conduit 50 extends for connection to suitable drain piping or plumbing (not shown).

While the construction thus far described comprises one or more of the tie rods 40, and the drain opening 48 and the drain conduit 50, it is to be understood that these component parts or elements are optional.

With particular reference to FIGURE 1, it is noted that the abutting edges or ends of the closures 44 with respect or relative to one another define a generally vertically extending or disposed plane 56. When four closures are used, as illustrated in that Figure, three such vertical planes 56 are presented. In accordance with the present invention, a cold plate 58, fabricated of any suitable material and in any suitable manner, is disposed along each of the planes 56 having a longitudinal dimensional extent or length substantially equal to the transverse dimensional extent or width of the chamber 18. In this connection, each of the cold plates may be press-fitted within the chamber and in abutting engagement with the side walls 20 thereof. The transverse dimensional extent or height or width of each of the cold plates is substantially less than that of the chamber 18, thus dividing the chamber into a plurality of inter-connected compartments, each compartment being closed by a corresponding one of the closures 44. Additionally, a relatively thin generally U-shaped frost shield 60, fabricated of any suitable material and in any suitable manner, is positioned upon each of the cold plates 58 in snug frictional engagement therewith. To maintain the frost shields upon the cold plates 58, notwithstanding the frictional engagement therebetween, the shields are inverted so that their bright portion engages the upper end or edge of a corresponding one of the cold plates.

As pointed out above, the cold plates 58 define inter-connected compartments. A number of symmetrically positioned mounting lugs or pins 62 are disposed within each of the compartments and are rigidly attached or connected to the side walls 20. As illustrated in the drawings, four such mounting lugs are positioned in each compartment. While the mounting lugs 62 may be fabricated in any suitable manner, preferably each lug comprises a base 64, a head 66 and a groove 68 disposed therebetween, for a purpose to be more fully described hereinafter. The lugs 62 may be rigidly secured to the walls 20 in any suitable manner, as by providing the same with exteriorly threaded stems 70 extending through suitable apertures (not shown) in the walls for mutual cooperatively engagement with suitable interiorly threaded conventional fasteners 72.

A clamping assembly 80 for relatively rigidly positioning the ice cream containers 28 with the chamber 18 of the cabinet 10 is stationarily positioned within each of the compartments thereof, as defined by the cold plates 58, by mounting the same upon each group of four lugs 62, in each compartment, and in frictional engagement therewith. With particular references to FIGURES 2 and 3, the clamping assembly 80 comprises a fixedly positioned wire mounting frame 82, fabricated in any suitable manner and of suitable material, such as a rust-resistant wire material having a suitable cross-sectional dimension.

The frame 82 is of generally rectangular configuration and, in turn, comprises an upper and lower generally horizontal wire element 84, disposed in parallel relationship relative to one another, and two spaced generally vertical end wire elements 86, also disposed in parallel relationship relative to one another. Each of the horizontal wire elements 84 are of the same configuration. To avoid repetition, therefore, only one of such elements will be described.

Each horizontal wire element 84 comprises a linear central portion 88, the longitudinal dimensional extent of which is substantially equal to the distance between a corresponding pair of mounting lugs 62. Each end 90 of the central portion 88 is turned generally vertically upwardly to form one leg of an inverted generally U-shaped mounting hook or loop 92. It is considered readily apparent that the bight of each loop is disposable within the groove 68 of a corresponding one of the lugs 62 and is frictionally engageable therewith. The end 94 of the other leg of each loop is turned to form a first minor portion 96 extending generally horizontally away from the major portion 88 but in parallel relationship therewith. The first minor portion 96 is then turned at 98 to form an inwardly extending minor portion 100 extending generally horizontally away therefrom, substantially at a right angle with respect or relative thereto, and inwardly of the walls 20 of the chamber 18. The inwardly extending minor portion 100 is then turned substantailly at a right angle relative thereto to form a second or other minor portion 102, of substantially the same longitudinal dimensional extent, and disposed in parallel relationship relative to the minor portion 96. The other minor portion 102 terminates in a loop, bearing or eye 104 located generally near or adjacent a corresponding one of the frost shields 60, as clearly illustrated in FIGURE 3.

Figure 3:
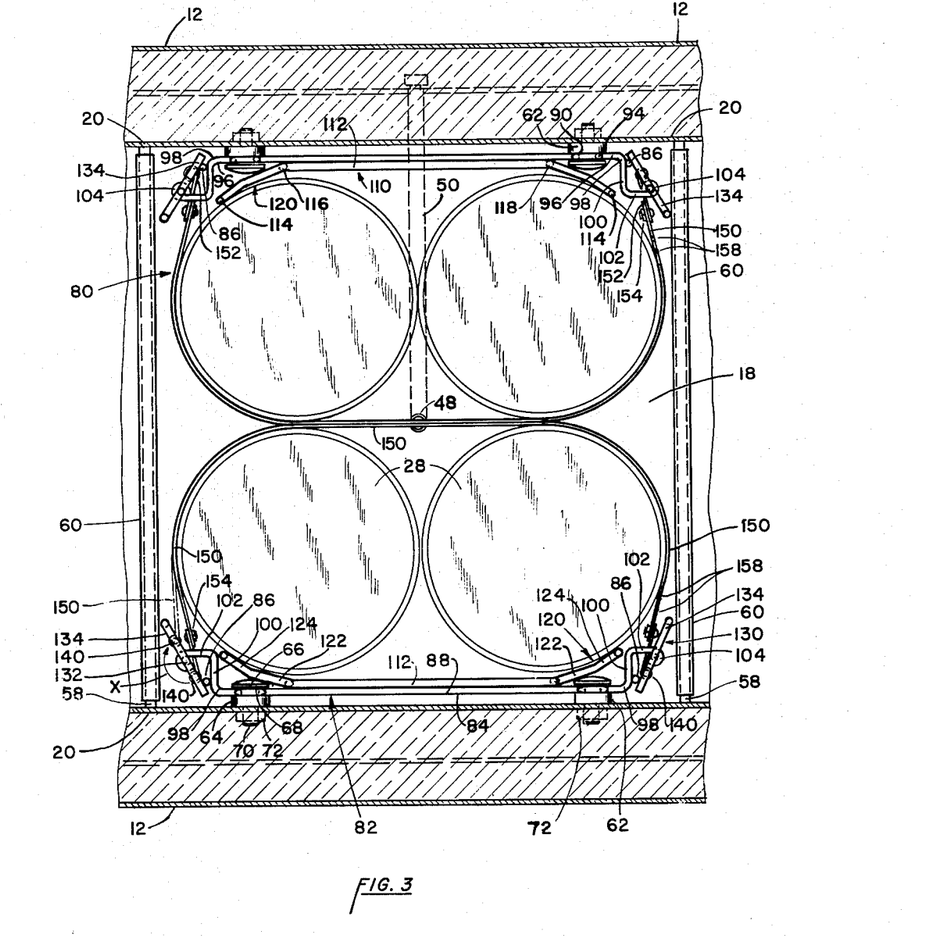
FIGURE 3 is a horizontal sectional view taken along the line 3—3 of FIGURE 2.
Figure 4:
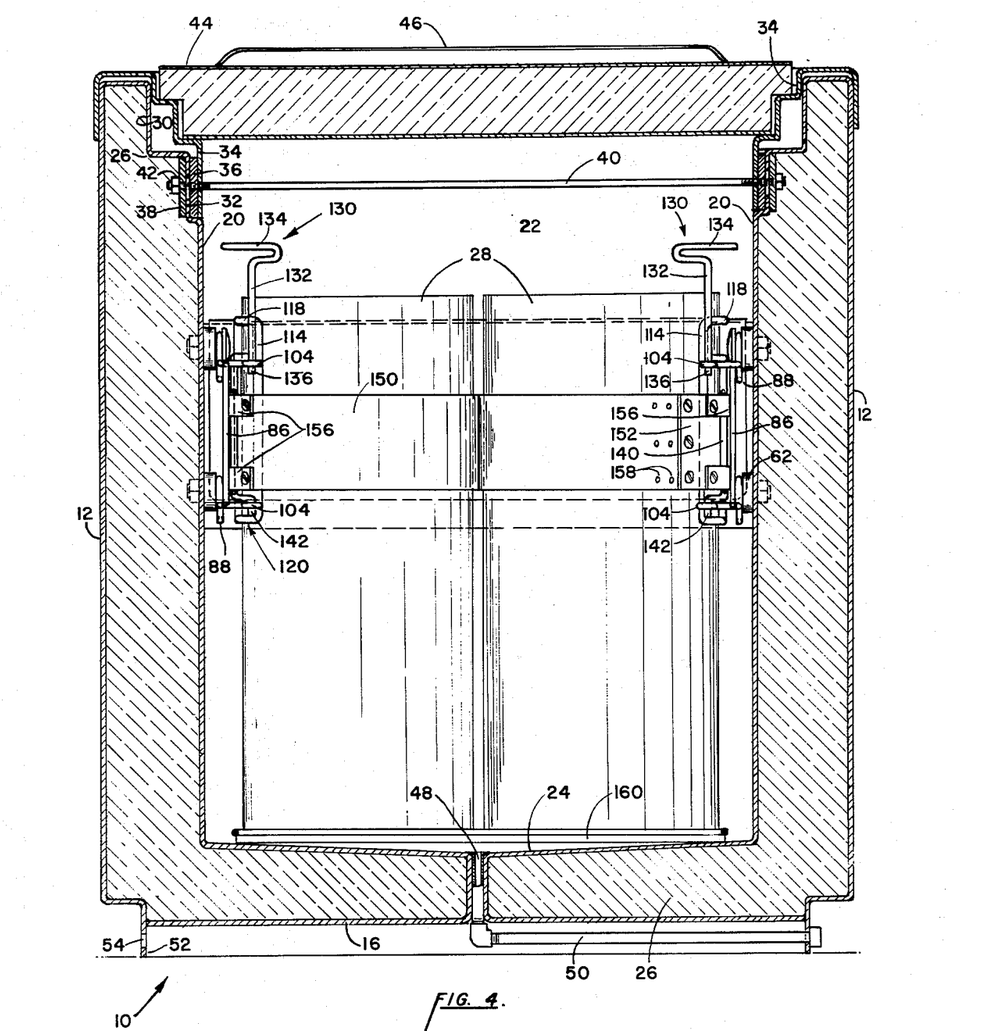
FIGURE 4 is a vertical sectional view taken along the line 4—4 of FIGURE 2.

With further reference to that figure, it will be seen that the vertically extending wire elements 86 are fixedly secured to the inwardly extending minor portion 100 of the wire elements 84 in any suitable manner, as by brazing, welding, or the like, to form toggle-lever abutments, for a purpose to be more fully described hereinafter. Additionally, the wire elements 86 perform the function of structural members rigidifying and strengthening the ends of the wire mounting frame 82, enabling the bearings 104 at the ends of each wire element 84 to be positioned and retained in vertical alignment with respect or relative to one an other.

The clamping assembly 80 comprises, further, a pressure frame 110, fabricated in any suitable manner and of any suitable material, such as wire, which pressure frame is fixedly positioned or mounted on the wire mounting frame 82. This may be accomplished in any suitable manner, as by brazing, welding, or the like, with the pressure frame positioned on that side of the mounting frame disposed or facing inwardly of the chamber 18. The wire pressure frame 110 is of an endless generally rectangular configuration and comprises, in turn, a plurality, and, as shown, two generally horizontal wire portions 112 disposed in spaced parallel relationship relative to one an other, and a plurality, as shown, two generally vertical outer wire portions 114, also disposed in spaced parallel relationship relative to one an other. The dimensions of the pressure frame 110 are predetermined so that the portions 114 are positioned near or substantially adjacent the inwardly extending minor portions 100 of the mounting frame 82 but longitudinally outwardly of or beyond the mounting lugs 62, as clearly illustrated in FIGURE 2. With continuing reference to that figure, it will be seen that the pressure frame 110 further comprises inner generally vertical wire portions 116 and 118, disposed in parallel relationship relative to one an other, and positioned somewhat inwardly of and substantially adjacent the mounting lugs 62. The inner wire portions 116 and 118 are fixedly connected to the horizontal wire portions 112 in any suitable manner, as by brazing, welding, or the like. Preferably, the wire portions 116 and 118 are disposed in coplanar relationship with respect or relative to the wire portions 112, to which they are connected. Each end portion or end 120 of the wire pressure frame 110, extending longitudinally between the vertical wire portions 114 and 116, and between the vertical wire portions 114 and 118, respectively, is turned or bent inwardly of the chamber 18 and, therefore, is acutely angularly disposed relative to the horizontal wire portions 112, as defined by developing the shortest annulus from the latter. In fabricating the pressure frame 110 the end portions or ends 120 are each provided with a particular degree of inherent resiliency. This may be accomplished in any suitable manner, the purpose of which will more fully be described hereinafter. Additionally, each of the ends 120 comprise a plurality and, as shown, two sections 122 and 124, each of which is disposed in acute angular relationship with the horizontal wire elements 112, as defined by developing an annulus in the same manner as described above. Moreover, the acute angular relationship of the section 122 relative to the wire elements 112 is different than that between the latter and the section 124. Preferably, the angular extent between the element 112 and the section 122 is less than that between the former and the section 124, as clearly illustrated in FIGURE 3.

The clamping assembly 80 comprises, further, a manually operable toggle-lever type or over-center clamp actuating or control member 130. A manual actuator 130 is rotatably positioned or disposed within each pair of vertically aligned bearings 104, one pair being located at each end of the mounting frame 82.

The manual actuator 130 comprises a rotatable vertically extending shaft 132 having an upper end forming a handle 134. The handle 134 is formed by turning the upper end of the shaft 132 to a generally horizontal direction, reversing the handle back upon itself, and extending the same symmetrically across the upper end. The lower end of the shaft 132 comprises an upper pin or pintle 136 which is rotatably positioned or disposed within an upper one of a pair of vertically aligned bearings or eyes 104.

The manual actuator 130 further comprises a generally vertical longitudinally dimensionally extensive shaft extension 138. The extension 138 is of generally U-shaped configuration, with the bight 140 thereof being of substantially greater dimensional extent than each of the legs. That is, the U-shaped extension 138 is relatively shallow. The upper end of the extension is fixedly connected, in any suitable manner, as by brazing, welding, or the like, to the lower end of the shaft 132 near or substantially adjacent the upper pintle 136. The lower or bottom leg of the U-shaped extension, which is directed generally horizontally from the bight 140, is turned to extend generally vertically downwardly, thus forming a lower pin or pintle 142. The lower pintle is positioned or disposed in coaxial relationship relative to the upper pintle 136 and is rotatably disposed within the lower one of a pair of vertically aligned bearings or eyes 104. The bight 140 of the extension 138 is so dimensioned as to insure that the lower pintle 142 will be properly rotatably disposed within a corresponding one of the eyes 104.

Still further, the clamping assembly 80 comprises an adjustable length flexible clamping band 150, fabricated in any suitable manner and of any suitable material, such as a suitable flexible metal. The transverse dimensional extent or width of the clamping band 150 is substantial, that is, relatively large.

The clamping band 150, further, is pivotally connected at each end thereof to the bight 140 of each one of a plurality of the toggle-lever actuators 130. To this end, a flexible shackle strap 152 is suitably fixedly secured to each end of the clamping band, as by threaded fasteners 154, or the like. The shackle straps are fabricated of the same transverse dimensional extent as the clamping band and comprise integral vertically spaced hinges 156 that are turned back upon themselves and are secured by such as threaded fasteners, which fasteners may be similar to the fasteners 154.

As clearly illustrated in the drawings, two clamping bands 150 are presented, each one being structurally operatively associated with a pair of toggle-lever actuators 130, and, since a pair of such actuators is presented, the clamping assembly 80 is comprised of a pair of wire mounting frames 82 and, correspondingly, a pair of wire pressure frames 110. In accordance with this construction, each clamping band 150 is capable of simultaneously fixedly positioning any number, from one to a plurality, of containers 28 within the chamber 18. As shown, each clamping band 150 simultaneously fixedly positions two or a pair of such containers 28 within the chamber 18. However, it is to be understood that only one clamping band 150 can be provided to simultaneously fixedly position any number of containers within the chamber. For example, a single clamping band can be used to position a quadrant, that is, four containers within the chamber. In this case, the clamping assembly 80 will comprise only one wire mounting frame 82, only one wire pressure frame 110, only two pairs of vertically aligned eyes 104 and only two or a pair of toggle-lever manual actuators 130.

Moreover, it is within the scope of this invention to provide adjustability of the length of the clamping bands 150, should containers 28 of various shapes and dimensional extent be positioned within the chamber 18. To this end, one of the shackle straps 152 is fabricated of greater longitudinal dimensional extent or length than the other. Additionally, the clamping band 150 is provided with apertures 153 at that end thereof to which the longer shackle strap 154 is attached. In this manner, adjustment along any desired length is provided and, at the same time, interference with or overlap of the hinges 156 by the end of a clamping band 150 is precluded. It is desirable that the hinges 156 be precluded from interference with the pivotable movement of the actuators 130 within a pair of eyes 104. To this end, suitable stops (not shown) may be provided, such as cotter pins extending transversely through apertures (not shown) in the actuators, above and below the straps 152, and near or substantially adjacent the hinges 156.

It is additionally desirable that the containers 28 be vertically spaced from the bottom wall 24 of the chamber 18. In this manner, sticking of the containers to the bottom wall due to the formation of frost, will be precluded. And, to this end, a suitable supporting surface comprising a wire rack 160 is positioned upon the bottom wall 24. In a similar manner, the clamping assembly 80, comprising at least one wire mounting frame 82 and at least one wire pressure frame 110, spaces the containers 28 from the side walls 20 of the chamber 18, thus precluding sticking therebetween. It is considered readily apparent, therefore, that the formation of frost within the chamber 18, resulting from vaporized moisture contained within the atmosphere entering the chamber 18 upon the removal therefrom of one or more of the covers 44, will not cause sticking between the containers 28 and the bottom wall 24 or the side walls 20. As a result, the containers 28 are always readily removable from the chamber 18 and easily replaced therewithin. Moreover, the frost shields 60, positioned upon the cold plates 58, will preclude vaporized moisture from flowing into the interconnected compartments adjacent an open compartment and forming a frost on the containers 28 therewithin. This will be true since any vaporized moisture that tends to flow into closed compartments when one is open will condense upon the frost shields and form a frost thereupon. Moreover, the frost shields will not interfere with any of the component parts of the clamping assembly 80 since, as particularly illustrated in FIGURE 3, the same are laterally spaced from the wire mounting frames 82 and the manual actuators 130. The same is true with regard to the covers or closures 44, since the shields are spaced vertically downwardly therefrom.

The operation of the present invention is considered readily apparent from the above description thereof. In describing the operation, however, let it be assumed that each compartment below a corresponding one of the covers or closures 44 contains a quadrant of convenientally sized commercial ice cream dispensing tubs or containers 28, as illustrated in the drawings. Also, as illustrated, let is be assumed that a pair of clamping bands 150 is provided, each of which fixedly positions a pair of such containers within a corresponding one of the compartments. Of course, it will be understood that the containers need not be ice cream containers, but can be any type of container usable for any purpose. And, as pointed out above, the container may be of any size or shape, since the clamping bands 150 are adjustable longitudinally thereof. In this connection, the bands may be of any desired transverse dimensional extent or width.

When one of the covers 44 is removed, and it is desirable to remove one or more of the containers 28 from the thus opened compartment, a corresponding one of the clamping bands 150 is released. This is accomplished by manually rotating one or both of the toggle-lever manual actuators 130 at the ends of the clamping band to be released. Thus, the handle 134 of a manual actuator 130 is grasped and rotated, upon its pintles 136 and 142, in such a direction as to move the end of the band away from the adjacent container. For example, and with particular reference to FIGURE 3, the handle of the actuator 130 in the lower lefthand corner of that figure is rotatably moved in the direction X, that is, clockwise, to move the end of the clamping band 150 rotatably connected to the bight 140 of that actuator away from the adjacent container 28. It fill be understood that a line of force, or a force component, is the result of or is defined by the tension in the band 150. This force component is directed along the clamping band and must be manually overcome before the band is released. Further, it will be understood that until the toggle-lever actuator 130 moves the clamping band to and beyond a dead-center position, as defined by its axis of rotation which, in turn, is defined by the pintles 136 and 142, manual pressure is required, lest the force component inherently return the clamping band to the position illustrated in FIGURE 3. However, once the actuator 130 is manually rotated to such a position as to move the clamping band 150 past the dead-center position, as just described, little, if any, manual effort will be required to move the band to the dotted-line position of that figure. In fact, once the band passes the dead-center position, the force component will inherently move the band to the dotted-line or released position, which is approximately 180 degrees rotatably removed from its initial clamping position.

While the release of only one clamping band 150 is adequate to free the containers 28 for removal from the chamber 18, the opposite end of the clamp band may also be released, by a similar actuation of the corresponding actuator 130. This may be desirable since, as is considered readily apparent, the pressure frame 110 exerts some pressure, due to the resiliency thereof, against the containers. Additionally, this may be desirable due to any frictional contact existing between adjacent containers. Of course, if the size and shape of the containers is such that no contact therebetween is present, then the release of only one end of a clamping band 150 will be sufficient.

Fixedy positioning one or more containers 28 within the clamping assembly 80 and, thus, within the chamber 18, is the reverse of the procedure described above. Referring again to FIGURE 3, and the toggle-lever manual actuator 130 in the lower left-hand corner thereof, the band 150 will initially lie in the released position indicated by the dotted lines. To fixedly position one of the containers within the clamping assembly, the actuator is manually rotated in a generally counter-clockwise direction, or reversly with respect to the direction X in which the handle was rotated to release the band. This rotation causes the bight 140 of the toggle-lever to pull on the end of the band rotatably connected thereto and, thus, pull the band into snug engagement with the containers. Furthermore, the containers 28 are thrust into firm abutting or pressure contact with the wire pressure frame 110. As in the case of releasing the band, manual pressure upon the actuator 130 is required until the bight 140 passes dead-center, as defined by the pintles 136 and 142. As the bight passes dead-center, the force component defined by the tension in the band passes dead-center and inherently pulls the band into the solid-line position of FIGURE 3. As previously pointed out, in this position, the end of the band 150 and the bight 140 of the actuator 130 are positioned in abutting engagement with the vertically extending wire element 86 of the wire mounting frame 82. It is considered readily apparent, therefore, that the elements 86 perform the function of and comprise a stop or abutment defining or determining the limit of movement of the actuator 130 in a direction bringing the band 150 into clamping engagement with the containers 28.

As the container or containers 28 are thrust against the wire pressure frame 110 the resilient end portions or ends 120, comprising the sections 122 and 124, are depressed or flexed slightly outwardly of the pressure frame. The effective length of the clamping band 150 is accordingly slightly increased to insure abutting engagement between the end thereof and the wire element 86. In turn, it is insured that the wire element 86 performs the function of an abutment or stop. Additionally, flexing of the end portions 120, moveably compensate for any shift of the containers 28 as the band 150 fixedly positions the containers relative to the pressure frame 110. If the actuator 130 at the opposite end of the band had been released, it is brought into a clamping position in the same manner.

It is to be understood that the clamping assemblies 80 are readily removable from the cabinet 10 for cleaning, or for any other purpose, as desired, once a cover or closure 44 has been removed, and the containers 28 removed in accordance with the above procedure. Only a slight manual upward pressure on the mounting frame or frames 82 of the clamping assembly will release the U-shaped loops 92 thereof from frictional engagement with and within the groove 68 of the mounting lugs 62. To replace the clamping assembly 80, comprising at least one wire mounting frame 82, at least one wire pressure frame 110, a pair of the toggle-lever manual actuators 130 and at least one clamping band 150, a reverse of the procedure just described is all that is necessary.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What I claim as my invention is:

1. A clamping assembly for fixedly positioning at least one and as much as a plurality of containers relative to support structure comprising:
   a generally rectangularly configured wire mounting frame comprising,
   an upper and lower generally horizontally extending wire element disposed in generally parallel relationship relative to one another,
   each of said wire elements having:
   a linear central portion,
   an inverted generally U-shaped loop at each end thereof,
   each of said loops being frictionally mutually cooperatively engageable with a mounting lug,
   one end of each of said loops being turned to form a first minor portion extending generally horizontally away from said major portion and in generally parallel relationship therewith,
   said first minor portion being turned to form an inwardly extending minor portion extending generally horizontally from said minor portion and at substantially right angles thereto,
   said inwardly extending minor portion being turned at substantially right angles to form a second minor portion of substantially the same longitudinal dimensional extent as said first minor portion and being disposed in generally parallel relationship relative thereto, each of said minor portions terminating in a bearing, the bearings at each end of the upper wire element being generally vertically aligned with the bearings at each end of the lower wire element, and a generally vertically extending wire element fixedly secured upon and to said inwardly extending minor elements and generally vertically between said upper and lower horizontal wire elements;

an endless generally rectangular wire pressure frame positioned upon said wire mounting frame, said pressure frame comprising, a plurality of generally horizontally extending wire portions disposed in substantially parallel relationship relative to one another, a plurality of generally vertically extending outer wire portions disposed in substantially parallel relationship relative to one another, and a plurality of generally vertically extending inner wire portions disposed in substantially parallel relationship relative to one another, the dimensional extent and configuration of said pressure frame being such as to position said outer wire portions substantially adjacent the inwardly extending minor portions of said mounting frame, each of the end portions of said pressure frame extending between the inner wire portions and the outer wire portions extending inwardly thereof and being acutely angularly disposed relative thereto, each of said end portions being inherently resilient and comprising:

a plurality of sections, one of said sections being acutely angularly disposed relative to said pressure frame to a greater angular extent than the other of said sections;

a manually operable toggle-lever actuator operatively disposed at each end of said mounting frame, said actuators comprising, a vertically extending shaft having an upper end defining a handle, said shaft having a lower end defining a pintle rotatably positioned within an upper one of a pair of vertically aligned bearings at each end of said mounting frame, a shallow generally U-shaped shaft extension extending vertically downwardly of said shaft, one leg of said U-shaped extension being connected to said shaft at the lower end thereof, the other leg of said U-shaped extension being turned to extend generally vertically downwardly to define another pintle rotatably positioned within a lower one of a pair of vertically aligned bearings at each end of said mounting frame; and a flexible clamping band comprising, a shackle strap connected at each end thereof having:

integral generally vertically spaced hinges within which the bight of said U-shaped extension is rotatably mutually cooperatively engageable, said band having aperture extending through at least one end thereof enabling the effective length thereof to be increased and decreased by adjustably positioning said shackle strap along the length thereof at said one end;

said actuators rendering said flexible clamping band moveable between a plurality of positions, enabling the clamping band, in one of said plurality of positions, to fixedly position at least one container between said band and said pressure frame, and, in another of said plurality of positions, enabling said band to release said container from clamping relationship relative to said band and said pressure frame, the vertically extending wire elements of said mounting frame defining an abutment determining the limit of movement of said clamping band in a direction towards said one position, and said resilient end portions applying a force in a direction to fixedly position at least one container between said clamping band and said pressure frame while simultaneously movably compensating for any shift of said container towards said pressure frame as said actuator is moved in a direction towards said one position.

2. In combination with supporting structure having an open chamber together with a closure for such chamber, a clamping assembly for fixably positioning at least one container within the chamber, said clamping assembly comprising, a mounting frame;

a pressure frame structurally operatively associated within said mounting frame;

a flexible clamping band;

at least one actuator structurally operatively associated with said clamping band and being so constituted and arranged as to move the band between a plurality of positions, enabling the clamping band, in one of said plurality of positions, to fixedly position at least one container between said band and said pressure frame, and, in another of said plurality of positions, enabling said band to release such container from clamping relationship relative to said band and said pressure frame;

at least one mounting lug positioned within said chamber, and a mounting hook frictionally mutually cooperatively engaging with said mounting lug for removably positioning such container within said chamber in spaced relationship to the support structure.

3. A clamping assembly as defined in claim 2, wherein: said mounting frame comprises:

a pair of generally vertically aligned bearings having an abutment positioned thereupon; and said actuator comprises:

a toggle-lever rotatably mutually cooperatively engageable within and relative to said bearings;

said flexible clamping band being pivotally structurally operatively associated with said toggle-lever and having the limit of movement thereof in a direction towards said one position being defined and determined by mutual cooperative engagement between said abutment and said toggle-lever and clamping band.

4. A clamping assembly as defined in claim 3, wherein: said actuator comprises:

a handle enabling said toggle-lever to be manually actuated to move said flexible clamping band between said plurality of positions.

5. A clamping assembly as defined in claim 3, wherein: said flexible clamping band comprises:

a shackle strap fixedly positioned at least upon one end thereof, and hinges positioned upon said shackle strap for pivotally structurally operatively associating said band with said toggle-lever;

said shackle strap being adjustable upon and relative to said band for enabling said assembly to fixedly position one or more containers of various configuration and dimensional extent by increasing the effective length of said band.

6. A clamping assembly as defined in claim 2, wherein: said pressure frame comprises:

at least one inherently resilient end portion generally acutely angularly disposed relative to said frame;

said resilient end portion applying a force in a direction to fixedly position at least one container between said clamping band and said pressure frame while simultaneously movably compensating for any shift of said container towards said pressure frame as said actuator is moved in a direction towards said one position.

7. A clamping assembly as defined in claim 2, wherein said assembly is fabricated of rust-resistant metallic wire.

8. A clamping assembly for fixedly positioning at least one container relative to support structure comprising:
   a mounting frame, said mounting frame comprising:
   a pair of generally vertically aligned bearings having an abutment positioned thereupon;
   a pressure frame, said pressure frame comprising:
   at least one inherently resilient end portion generally acutely angularly disposed relative to said frame;
   a flexible clamping band, said clamping band comprising:
   a shackle strap fixedly positioned at least upon one end thereof, and
   hinges positioned upon said shackle strap;
   said shackle strap being adjustable upon and relative to said band for enabling said assembly to fixedly position one or more containers of various configuration and dimensional extent by increasing the effective length of said band; and
   at least one actuator structurally operatively associated with said clamping band and being so constituted and arranged as to move the band between a plurality of positions, enabling the clamping band, in one of said plurality of positions, to fixedly position at least one and as much as a plurality of containers between said band and said pressure frame, and, in another of said plurality of positions, enabling said band to release said container from clamping relationship relative to said band and said pressure frame, said actuator comprising:
   a toggle-lever rotatably mutually cooperatively engageable within and relative to said bearings,
   said toggle-lever being pivotally structurally operatively associated within and relative to said hinges, and
   a handle enabling said toggle-lever to be actuated to move said flexible clamping band between said plurality of positions;
   said resilient end portion applying a force in a direction to fixedly position at least one container between said clamping band and said pressure frame while simultaneously movably compensating for any shift of said container towards said pressure frame as said actuator is moved in a direction towards said one position, the limit of movement of said toggle lever and said clamping band towards said one position being defined and determined by mutual cooperative engagement with said abutment;
   at least one mounting lug positioned upon the support structure, and
   a mounting hook carried by the clamping assembly for fixedly mutually cooperatively engaging the mounting lug to removably position the container in spaced relationship relative to the support structure.

9. In combination with supporting structure for removably supporting therewithin at least one container wherein said supporting structure comprises:
   a plurality of interiorly disposed walls defining a chamber having an upper open end, and
   a plurality of removable closures structurally operatively associated with said chamber at the upper open end thereof;
   a plurality of generally vertically extending frost shields positioned within said chamber, the number of said shields corresponding to one less than the number of closures,
   said frost shields being dimensionally so constituted and arranged as to divide said chamber into a plurality of interconnected compartments corresponding in number to the number of closures, and
   a clamping assembly for fixedly positioning at least one container in spaced relationship relative to the walls of said chamber, said clamping assembly comprising:
   a mounting frame;
   a pressure frame structurally operatively associated with said mounting frame;
   a flexible clamping band;
   at least one actuator structurally operatively associated with said clamping band and being so constituted and arranged as to move the band between a plurality of positions, enabling the clamping band, in one of said plurality of positions, to fixedly position at least one container between said band and said pressure frame, and, in another of said plurality of positions, enabling said band to release said container from clamping relationship relative to said band and said pressure frame;
   at least one mounting lug fixedly positioned upon the walls of and within said chamber; and
   a mounting hook frictionally mutually cooperatively engageable with said mounting lug for removably positioning said clamping assembly upon the walls of and within said chamber,
   said mounting hook being provided in number corresponding to the number of mounting lugs provided; and
   said clamping assembly and mounting lugs being dimensionally and structurally so constituted and arranged as to position at least one and as much as a plurality of containers in spaced relationship relative to the walls of said chamber.

10. In the combination as defined in claim 9, wherein:
    said mounting frame comprises:
    a pair of generally vertically aligned bearings having an abutment positioned thereupon; and
    said actuator comprises:
    a toggle-lever rotatably mutually cooperatively engageable within and realtive to said bearings;
    said flexible clamping band being pivotally structurally operatively associated with said toggle-lever and having the limit of movement thereof in a direction towards said one position being defined and determined by mutual cooperative engagement between said abutment and said toggle-lever and clamping band.

11. In the combination as defined in claim 10 wherein:
    said actuator comprises;
    a handle enabling said toggle-lever to be manually actuated to move said flexible clamping band between said plurality of positions.

12. In the combination as defined in claim 9, wherein:
    said flexible clamping band comprises:
    a shackle strap fixedly positioned at least upon one end thereof, and
    hinges positioned upon said shackle strap for pivotally structurally operatively associating said band with said toggle-lever;
    said shackle strap being adjustable upon and relative to said band enabling said assembly to fixedly position one or more containers of various configuration and dimensional extent by increasing the effective length of said band.

13. In the combination as defined in claim 9, wherein:
    said pressure frame comprises:
    at least one inherently resilient end portion generally acutely angularly disposed relative to said frame;
    said resilient end portion applying a force in a direction to fixedly position at least one container between said clamping band and said pressure frame while simultaneously movably compensating for any shift of said container towards said pressure frame as said actuator is moved in a direction towards said one position.

14. In the combination as defined in claim 9, wherein:
    said assembly is fabricated of rust-resistant metallic material.

15. In combination with supporting structure for removably supporting therewithin at least one and as much as a plurality of containers comprising:
a plurality of interiorly disposed walls defining a chamber having an upper open end,
a plurality of removable closures structurally operatively associated with said chamber at the upper open end thereof,
a plurality of generally vertically extending frost shields positioned within said chamber, the number of shields corresponding to one less than the number of closures,
said frost shields being dimensionally so constituted and arranged as to divide said chamber into a plurality of interconnected compartments corresponding in number to the number of closures, and
a clamping assembly for fixedly positioning at least one and as much as a plurality of containers in spaced relationship to the walls of said chamber, said assembly comprising:
a mounting frame comprising,
a pair of generally vertically aligned bearings,
an abutment positioned thereupon, and
at least one mounting hook frictionally mutually cooperatively engageable with said mounting lug for removably positioning said clamping assembly upon the walls of and within said chamber,
said mounting hook being provided in number corresponding to the number of mounting lugs provided;
a pressure frame, said pressure frame comprising:
at least one inherently resilient end portion generally acutely angularly disposed relative to said frame;
a flexible clamping band, said clamping band comprising:
a shackle strap fixedly positioned at least upon one end thereof, and
hinges positioned upon said shackle strap;
said shackle strap being adjustable upon and relative to said band enabling said assembly to fixedly position one or more containers of various configuration and dimensional extent by increasing the effective length of said band; and
at least one actuator structurally operatively associated with said clamping band and being so constituted and arranged as to move the band between a plurality of positions, enabling the clamping band, in one of the positions thereof, to fixedly position at least one and as much as a plurality of containers between said band and said pressure frame, and, in another of said plurality, of positions, enabling said band to release said container from clamping relationship relative to said band and said pressure frame, said actuator comprising:
a toggle-lever rotatably mutually cooperatively engageable within and relative to said bearings,
said toggle-lever being pivotally structurally operatively associated within and relative to said hinges, and
a handle enabling said toggle-lever to be manually actuated to move said flexible clamping band between said plurality of positions;
said resilient end portion applying a force in a direction to fixedly position at least one and as much as a plurality of containers between said clamping band and said pressure frame while simultaneously movably compensating for any shift of said container towards said pressure frame as said actuator is moved in a direction towards said one position, the limit of movement of said toggle-lever and said clamping band towards said one position being defined and determined by mutual cooperative engagement with said abutment;
said clamping assembly and mounting lugs being dimensionally and structurally so constituted and arranged as to position at least one and as much as a plurality of containers in spaced relationship relative to the walls of said chamber.

16. In the combination as defined in claim 15, said clamping assembly being fabricated of rust-resistant metallic wire.

17. In combination with supporting structure having wall portions defining an open chamber and a closure for such chamber,
a clamping assembly for fixedly positioning at least one container in spaced relationship relative to the wall portions of the chamber,
said clamping assembly comprising,
a mounting frame,
a pressure frame structurally operatively associated with said mounting frame,
a flexible clamping band,
an actuator structurally operatively associated with said clamping band and being so constituted and arranged as to move the band between a plurality of positions for enabling the clamping band in one of said positions to fixedly position such container between the band and the pressure frame while in another of said positions enabling the band to release such container from a clamping relationship relative to the band and the pressure frame,
at least one mounting lug positioned upon the wall portions of and within the chamber, and
a mounting hook for frictionally mutually cooperatively engaging the mounting lug to removably position the clamping assembly upon the wall portions of and within said chamber,
the clamping assembly and the mounting lug being dimensionally and structurally constituted and arranged so as to position such container in spaced relationship relative to the wall portions of the chamber.

References Cited by the Examiner

UNITED STATES PATENTS

| | | | |
|---|---|---|---|
| 1,288,839 | 12/1918 | Conrad et al. | 248—313 |
| 2,354,935 | 8/1944 | Andrea | 248—361 |
| 2,549,084 | 4/1951 | Heth | 248—361 X |
| 2,595,129 | 4/1952 | Duguay | 312—320 X |

CHANCELLOR E. HARRIS, *Primary Examiner.*